United States Patent

Moller

[15] 3,637,966

[45] Jan. 25, 1972

[54] FLUIDIZED BED OF SOLID PARTICLES, AND METHOD OF USING IT

[72] Inventor: Werner Moller, Dubendorf, Switzerland

[73] Assignee: Oerlikon Engineering Company

[22] Filed: May 3, 1968

[21] Appl. No.: 726,598

[30] Foreign Application Priority Data

May 12, 1967 Switzerland ..........................6816/67

[52] U.S. Cl. ...................200/148 G, 200/144 C, 200/149 A, 252/463, 23/142
[51] Int. Cl. .......................................................H01h 33/22
[58] Field of Search............174/174 AT; 336/57; 200/144.3, 200/149.1, 151, 149 A; 252/463; 23/142

[56] References Cited

UNITED STATES PATENTS

| | | | |
|---|---|---|---|
| 3,422,455 | 1/1969 | Greber | 200/151 |
| 3,469,047 | 9/1969 | Berg et al. | 200/144 C |

FOREIGN PATENTS OR APPLICATIONS

| | | | |
|---|---|---|---|
| 1,166,324 | 3/1964 | Germany | 200/149 A |

Primary Examiner—Robert S. Macon
Attorney—Breitenfeld & Levine

[57] ABSTRACT

Fluidized bed comprises discrete particles of alumina trihydrate, and a gas such as air or sulfur hexafluoride is directed through particles to fluidize them. Fluidized bed may be used as a cooling medium for electrical apparatus, such as transformers, and as a medium to assist in extinguishing the arc between switch contacts.

4 Claims, No Drawings

FLUIDIZED BED OF SOLID PARTICLES, AND METHOD OF USING IT

The present invention relates to a fluidized bed, in which a pulverized solid is moved by means of a gas, and also to the use of such a bed.

Fluidized beds incorporating solid discrete particles are known in the prior art in which quartz sand, corundum, and plastics are used as the solid particles, and air, carbon dioxide, and hydrogen as the fluidizing gases. Corundum and quartz sand, are disadvantageous, because, inter alia, they produce an extremely large amount of abrasion; plastics on the other hand exhibit low resistance to heat. In addition, frequently a uniform bed of solids cannot be readily obtained and the required gas pressures are relatively high.

The deficiencies of the prior art can be avoided, in accordance with the invention, by employing alumina trihydrate (aluminum oxide trihydrate) as the solid particles. In accordance with other features of the invention, the fluidized bed may be used to insulate and cool electrical instruments and apparatus.

Either air or sulfur hexafluoride may be used as the fluidizing gas.

The size of the alumina trihydrate particles should be between 5 and 100 microns, and preferably 10 microns. The gas velocity should be between 0.3 and 0.7 meter per second, and is preferably 0.5 meter per second.

The advantages of the invention reside not only in reduced cost as compared to prior art beds, but also, inter alia, in that abrasion is substantially avoided, and there is no danger of the formation of crusts. Furthermore, the formation of a fluidized bed is possible even with a low-pressure fluidizing gas. The bed also has excellent electrical and thermal properties.

The fluidized bed of solid particles can advantageously be used in transformers. In this case, it is merely necessary to circulate the gas through a cooling circuit while the level of the bed of solids remains approximately the same. Alternatively, the entire bed could be circulated, and if necessary cooled from time to time. Investigations have shown that when the techniques described above are used, no changes due to aging occur in the customary insulation of a transformer. Furthermore, heat transfer takes place just as rapidly as when transformer oil is used as the coolant, and much more rapidly than when air alone is used. Improved heat transfer with respect to air alone is believed to be due to the fact that the thermal conductivity of the particles of the fluidized bed exceeds that of air.

When the fluidized bed of solid particles is used as an assist in extinguishing the arc of electrical switches, the corrosive decomposition products of sulfur hexafluoride, particularly sulfur difluoride and sulfur tetrafluoride, which are produced in the arc are converted into harmless products, particularly aluminum fluoride compounds.

What is claimed is:

1. A fluidizable bed comprising a bed of solid discrete particles, substantially all of said particles being alumina trihydrate, and means for directing sulfur hexafluoride gas through the bed to fluidize said particles.

2. A method of cooling electrical apparatus having a path for accommodating a cooling fluid, comprising the steps of providing a bed formed substantially entirely of discrete alumina trihydrate particles, fluidizing the particles by means of a gas, and directing the gas and fluidized particles along the path.

3. A method as defined in claim 2 wherein the apparatus is a transformer.

4. A method as defined in claim 2 wherein the apparatus is a switch, the path includes the switch contacts, and said gas and fluidized particles are directed along the path while the switch is opened so that they assist in extinguishing the arc which forms between the contacts.

* * * * *